United States Patent
Bichkar et al.

(10) Patent No.: US 11,940,023 B2
(45) Date of Patent: Mar. 26, 2024

(54) SYSTEM AND METHOD FOR DRIVELINE DISCONNECT CLUTCH DE-STROKING AND PREPOSITIONING

(71) Applicant: Ford Global Technologies, LLC, Dearborn, MI (US)

(72) Inventors: Akshay Bichkar, Ann Arbor, MI (US); Corey James Blue, Belleville, MI (US); Jason Meyer, Canton, MI (US); Maruthi Ravichandran, Dearborn, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/823,894

(22) Filed: Aug. 31, 2022

(65) Prior Publication Data
US 2024/0068532 A1    Feb. 29, 2024

(51) Int. Cl.
*F16D 48/06* (2006.01)
*B60W 20/40* (2016.01)

(52) U.S. Cl.
CPC .......... *F16D 48/066* (2013.01); *B60W 20/40* (2013.01); *B60W 2510/02* (2013.01); *B60W 2510/107* (2013.01); *F16D 2500/10412* (2013.01); *F16D 2500/3024* (2013.01); *F16D 2500/3026* (2013.01); *F16D 2500/30415* (2013.01); *F16D 2500/30803* (2013.01)

(58) Field of Classification Search
None
See application file for complete search history.

(56) References Cited

U.S. PATENT DOCUMENTS

| | | | |
|---|---|---|---|
| 9,108,613 B2 | 8/2015 | Gibson et al. | |
| 10,525,969 B2 | 1/2020 | Doering et al. | |
| 2013/0297161 A1* | 11/2013 | Gibson | F16H 61/21 180/65.265 |
| 2014/0004997 A1* | 1/2014 | Wang | B60W 30/20 180/65.265 |
| 2015/0360683 A1 | 12/2015 | Gibson et al. | |
| 2022/0009473 A1 | 1/2022 | Zhao et al. | |

OTHER PUBLICATIONS

Bichkar, A. et al., "Driveline Disconnect Clutch Operating Methods and System," U.S. Appl. No. 17/643,754, filed Dec. 10, 2021, 43 pages.

* cited by examiner

*Primary Examiner* — Timothy Hannon
(74) *Attorney, Agent, or Firm* — David Kelley; McCoy Russell LLP

(57) ABSTRACT

Systems and methods for operating a driveline disconnect clutch of a hybrid vehicle are presented. In one example, a driveline disconnect clutch is de-stroked in a particular way so that the driveline disconnect clutch may be de-stroked more consistently. The de-stroking process may be followed by boosting and stroking the driveline disconnect clutch so as to preposition the driveline disconnect clutch or holding the clutch at an offset below stroke pressure to minimize drag.

20 Claims, 5 Drawing Sheets

SYSTEM AND METHOD FOR DRIVELINE DISCONNECT CLUTCH DE-STROKING AND PREPOSITIONING

FIELD

The present description relates to methods and a system for operating a driveline disconnect clutch of a hybrid vehicle.

BACKGROUND AND SUMMARY

A driveline disconnect clutch may be closed to couple an engine to a driveline that includes an electric machine when driver demand is high or a battery state of charge is low. The driveline disconnect clutch may be opened when driver demand is low and battery state of charge is high. Because the operating state of the driveline disconnect clutch may be based at least in part on driver demand, it may be possible for the driveline disconnect clutch to be opened and then commanded closed in response to increasing driver demand shortly after the driveline disconnect clutch was commanded open. If the driveline disconnect clutch is not at an expected position and the driveline disconnect clutch is commanded closed, the amount of torque that is transferred by the driveline disconnect clutch may not match the commanded driveline disconnect clutch capacity. Consequently, torque disturbances may occur within the driveline, thereby degrading vehicle drivability.

The inventors herein have recognized the above-mentioned issue and have developed a method for operating a vehicle, comprising: via one or more controllers, commanding fully open pressure followed by an increase in a driveline disconnect clutch pressure in response to a driveline disconnect clutch de-stroke signature, where the driveline disconnect clutch de-stroke signature is a pressure that is less than an expected stroke pressure of a driveline disconnect clutch for a threshold amount of time.

By commanding fully open pressure and only commanding an increase in driveline disconnect clutch pressure in response to a driveline disconnect clutch de-stroke signature, it may be possible to reduce an amount of time it takes to reach a repeatable clutch operating position. Once the driveline disconnect clutch reaches the repeatable clutch operating condition, the driveline disconnect clutch may be closed smoothly to reduce a possibility of driveline torque disturbances. In this way, the driveline disconnect clutch may be operated in a way that shortens the amount of time for the driveline disconnect clutch to reach a position where disconnect clutch closing may be made more repeatable.

The present description may provide several advantages. In particular, the approach may reduce driveline torque disturbances. Further, the approach may improve vehicle drivability. Additionally, the approach may provide improved vehicle operation during change of mind operating conditions. The approach may also provide fuel economy improvement by reducing engine on time during engine shutdown.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
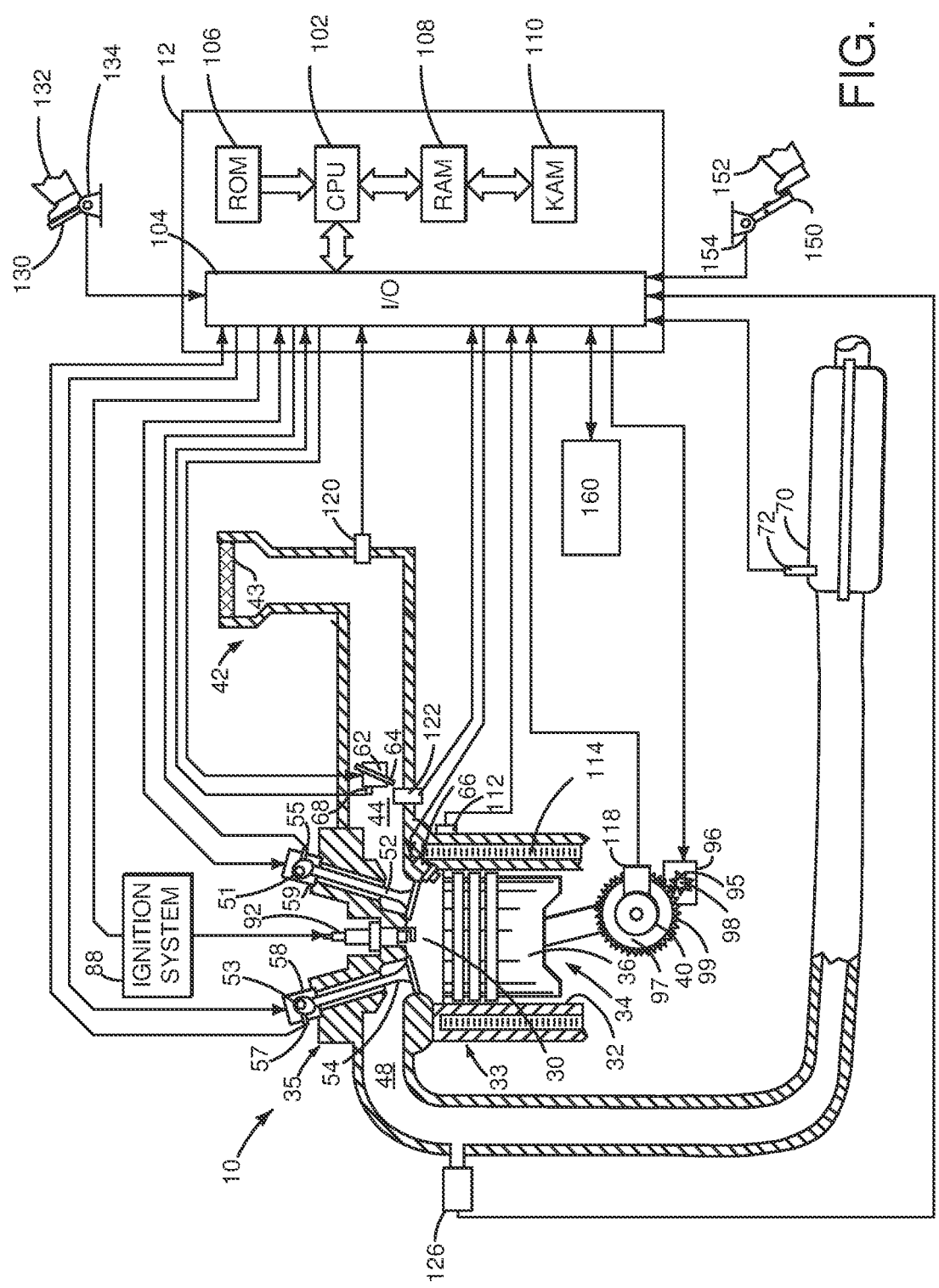
FIG. 1 is a schematic diagram of an engine.
Figure 2:
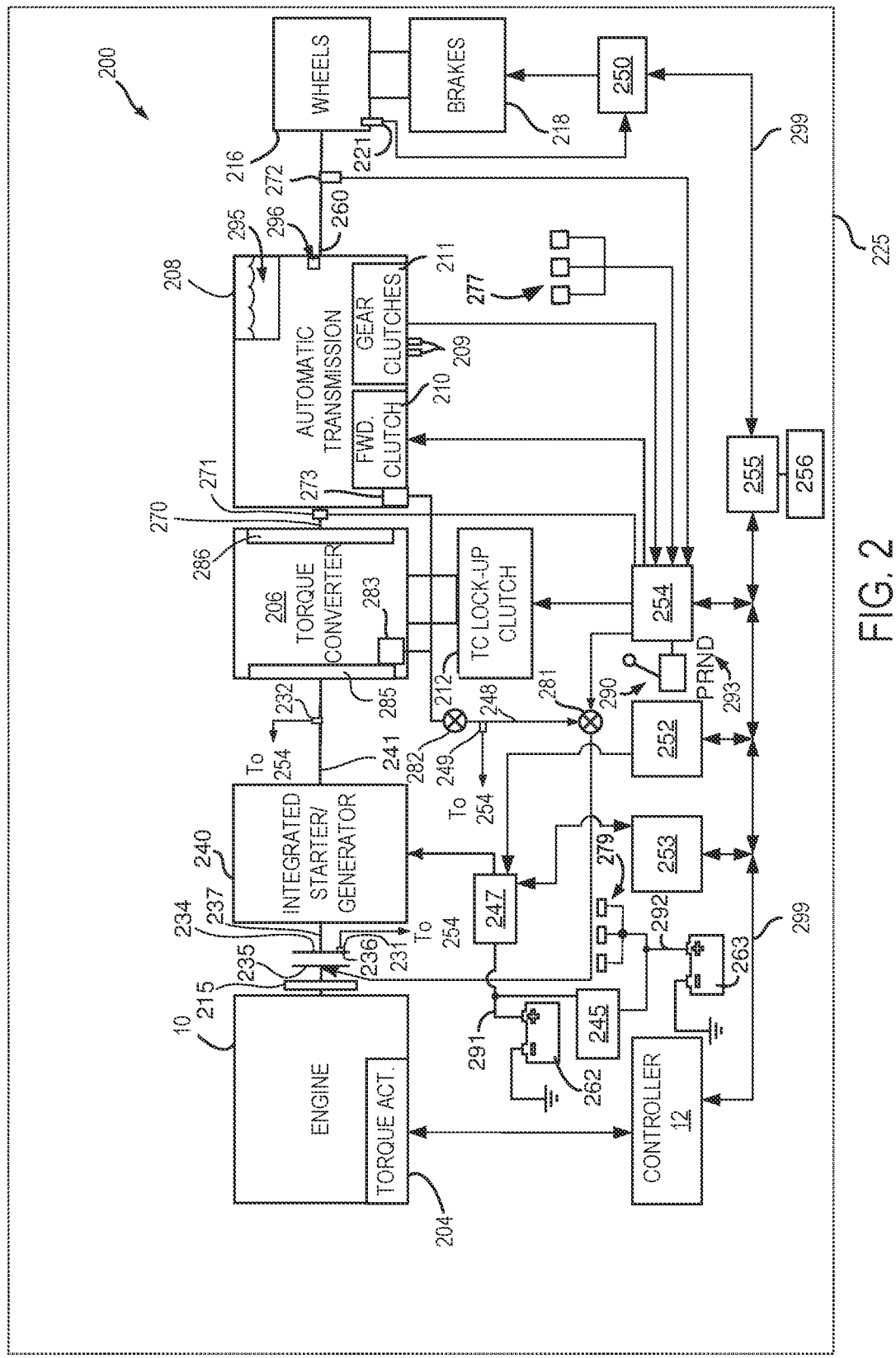
FIG. 2 is a schematic diagram of a hybrid vehicle driveline including the engine of FIG. 1.
Figure 3:
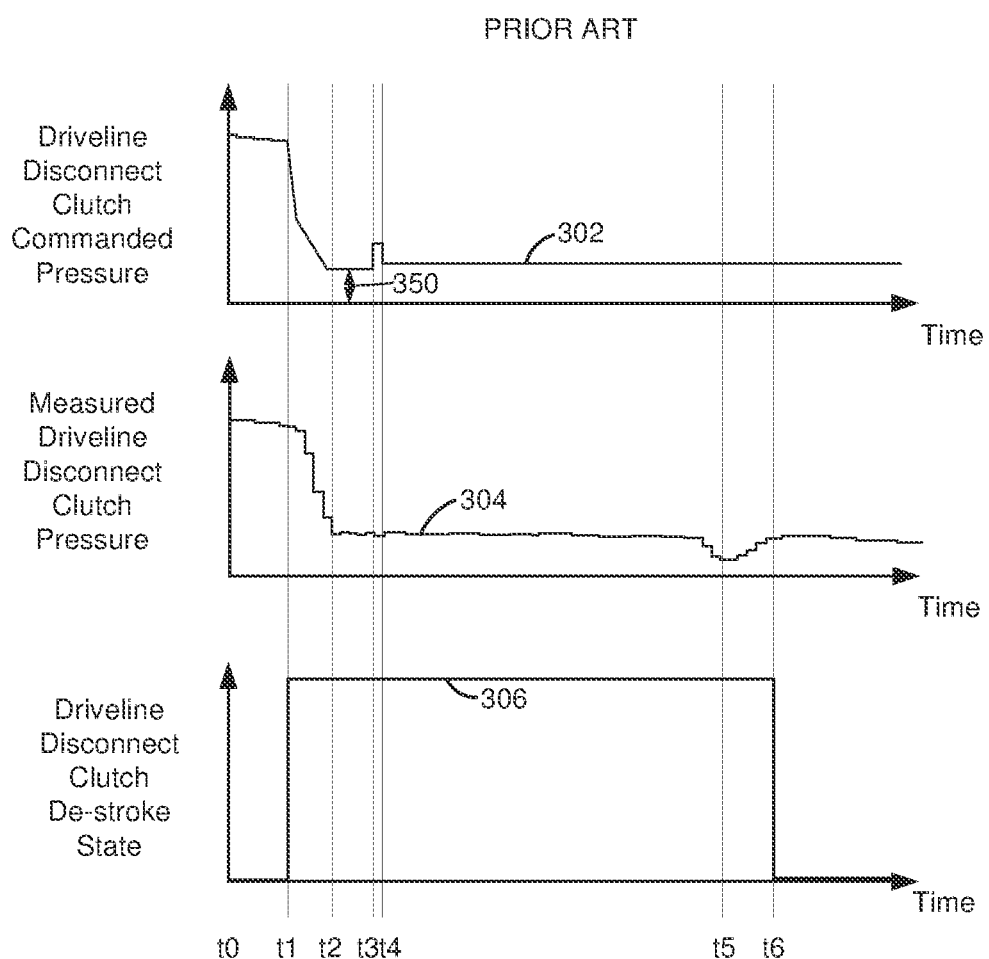
FIG. 3 shows a prior art approach to de-stroking a driveline disconnect clutch.
Figure 4:
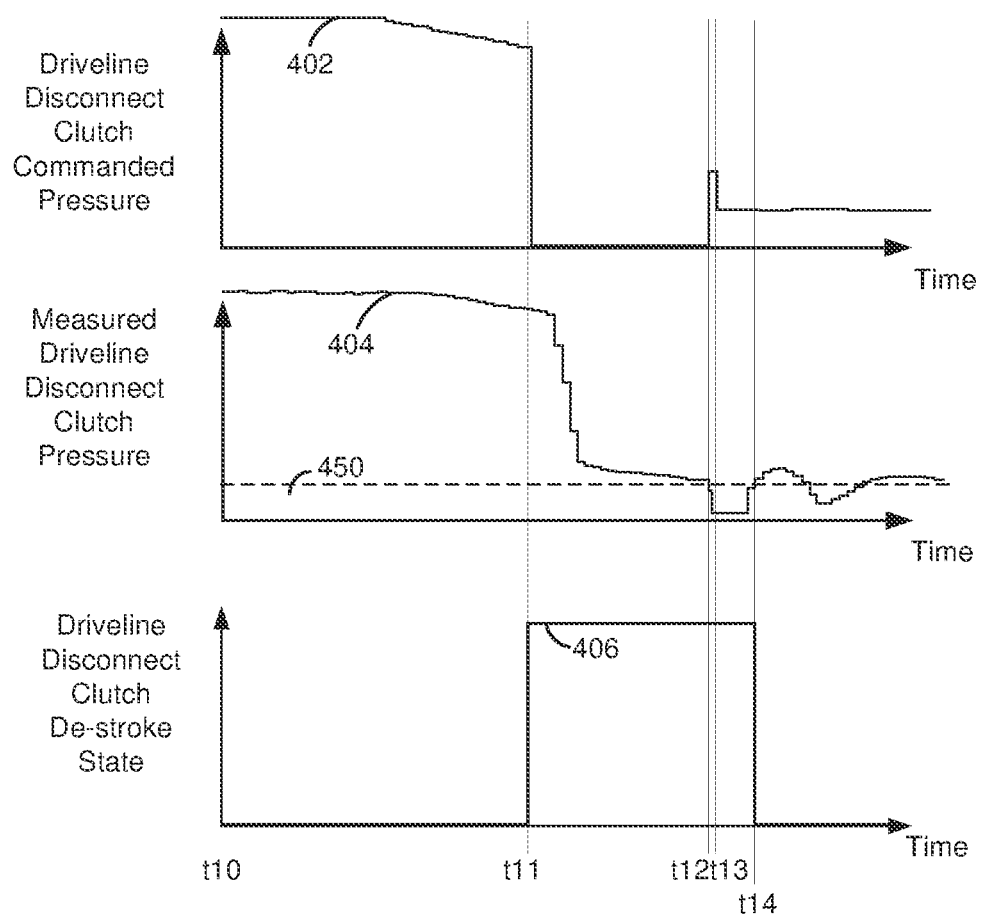
FIG. 4 shows an approach to de-stroking a driveline disconnect clutch according to the method of FIG. 5.
Figure 5:
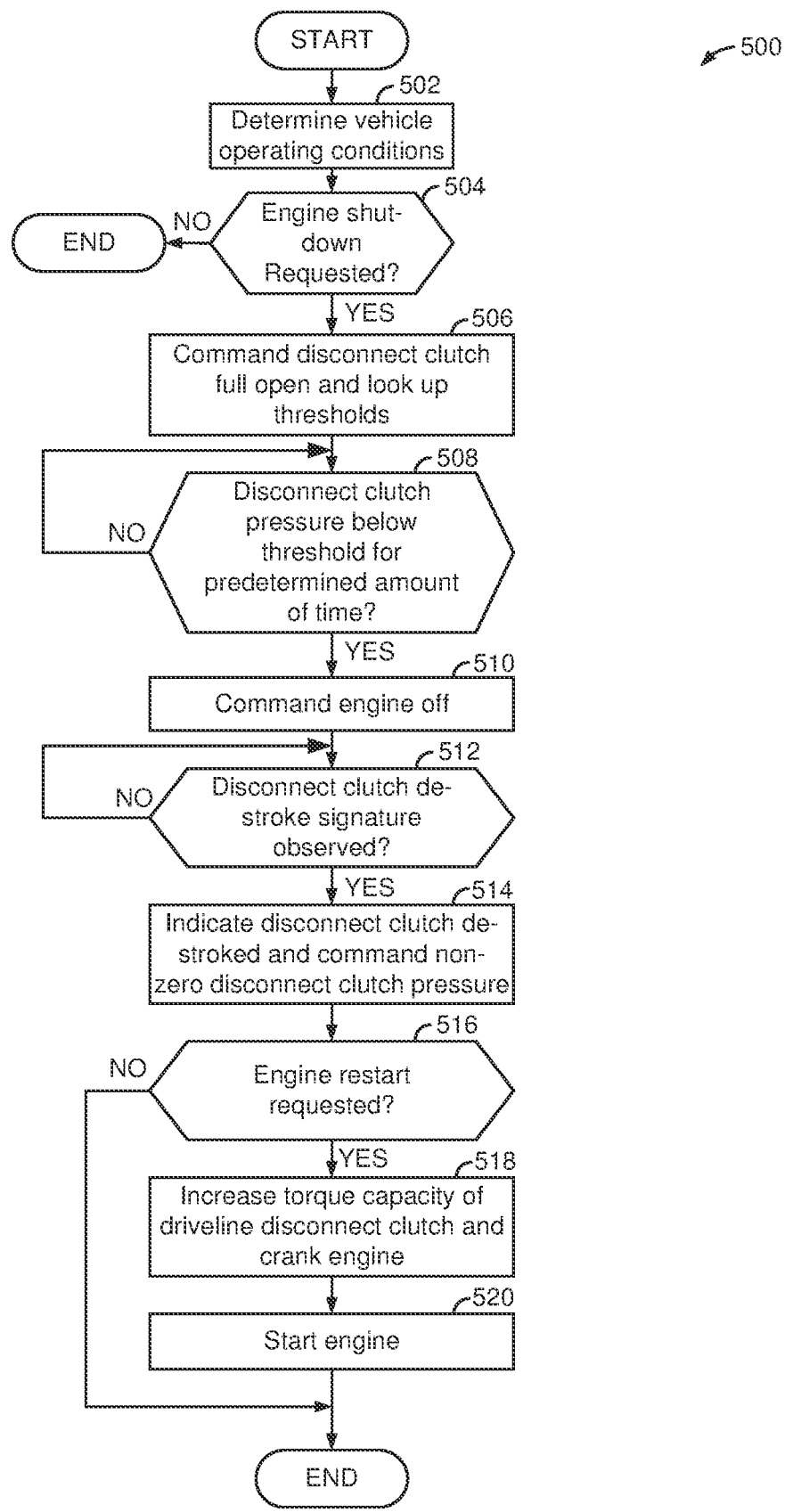
FIG. 5 shows a method for controlling a driveline disconnect clutch.

The present description is related to improving operation of a driveline disconnect clutch of a hybrid vehicle. Specifically, the driveline disconnect clutch may be de-stroked in a way that reduces an amount of time it takes for the driveline disconnect clutch to reach a position where the driveline disconnect clutch may provide repeatable operation. Once in position, the driveline disconnect clutch may be commanded to provide a cranking torque or to fully close. The position where driveline disconnect clutch operation may be made more repeatable may provide more consistent driveline disconnect clutch boosting (e.g., building of pressure in the driveline disconnect clutch in a way that provides a smooth torque capacity increase). The driveline disconnect clutch may be coupled to an engine of the type that is shown in FIG. 1. The engine may be included in a driveline as shown in FIG. 2. Plots of a prior art approach to driveline disconnect clutch operation is shown in FIG. 3. Plots of driveline disconnect clutch operation according to the method of FIG. 5 are shown in FIG. 4. A method for operating a driveline disconnect clutch is shown in FIG. 5. It should be noted that although this description mentions driveline disconnect clutch pressure, driveline disconnect clutch torque capacity may be substituted for driveline disconnect clutch pressure since driveline disconnect clutch torque capacity may be closely related to driveline disconnect clutch pressure.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electro-mechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter (e.g., catalyst) may be monitored via temperature sensor 72.

Controller 12 may receive input data from and provide output data to human/machine interface 160. Human/machine interface 160 may be a touch screen display, keyboard, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12.

In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid in line 248 that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line 248 (e.g., a conduit) may receive transmission fluid 295 from electric transmission fluid pump 273 and/or pump 283. Pressure in line 248 (e.g., line pressure) may be sensed via pressure sensor 249 and pressure in driveline disconnect clutch 236 may be sensed via pressure sensor 231.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271 and speed of electric machine 240 via position sensor 232. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; and a controller including executable instructions stored in non-transitory memory that cause the controller to command an increase in a driveline disconnect clutch pressure in response to a driveline disconnect clutch de-stroke signature, where the driveline disconnect clutch de-stroke signature is a pressure that is less than an offset pressure from an expected stroke pressure of a driveline disconnect clutch for a threshold amount of time, and where the driveline disconnect clutch de-stroke signature begins at a most recent time when the driveline disconnect clutch pressure drops below the offset pressure from the expected stroke pressure. In a first example, the system further comprises additional executable instructions to command a pressure in the disconnect clutch pressure in response to an engine stop request. In a second example that may include the first example, the system includes where the pressure is substantially zero pressure. In a third example that may include one or both of the first and second examples, the system further comprises additional executable instructions to shut down the internal combustion engine in response to the most recent time when the driveline disconnect clutch pressure drops below the offset pressure for the threshold amount of time. In a fourth example that may include one or more of the first through third examples, the system includes where the threshold amount of time is based on transmission fluid temperature. In a fifth example that may include one or more of the first through fourth examples, the system includes where the threshold amount of time is further based on a torque converter impeller speed. In a sixth example that may include one or more of the first through fifth examples, the system further comprises additional executable instructions to command the disconnect clutch to transfer cranking torque to an engine in response to an engine start request. In a seventh example that may include one or more of the first through sixth examples, the system further comprises additional executable instructions to command the driveline disconnect clutch fully closed in response to the engine start request.

Referring now to FIG. 3, plots of a prophetic driveline disconnect clutch de-stroking sequence according to a prior art method are shown. The vertical lines at times t0-t6 represent times of interest in the plots. The plots are time aligned.

The first plot from the top of FIG. 3 shows commanded driveline disconnect clutch pressure versus time. The commanded driveline disconnect clutch pressure is a commanded pressure within the driveline disconnect clutch. The commanded driveline disconnect clutch pressure is a pressure command that the driveline disconnect clutch pressure control valve (e.g., 281 of FIG. 2) regulates or controls to in the driveline disconnect clutch. For example, the disconnect clutch pressure control valve may be commanded to regulate disconnect clutch pressure to 680 kilopascals. The vertical axis represents pressure and pressure increases in the direction of the vertical axis arrow. The horizontal axis represents time and time increases from the left side of the plot to the right side of the plot. Trace 302 represents the pressure value for the commanded driveline disconnect clutch pressure.

The second plot from the top of FIG. 3 shows a measured driveline disconnect clutch pressure versus time. The measured driveline disconnect clutch pressure may be a pressure that is sensed via a sensor (e.g., 236 of FIG. 2). The vertical axis represents pressure and pressure increases in the direction of the vertical axis arrow. The horizontal axis represents time and time increases from the left side of the plot to the right side of the plot. Trace 304 represents the pressure value of the driveline disconnect clutch pressure.

The third plot from the top of FIG. 3 shows a driveline disconnect clutch de-stroking state versus time. The vertical axis represents the driveline disconnect clutch de-stroking state and the driveline disconnect clutch de-stroking state is asserted (e.g., the driveline disconnect clutch is being de-stoked such that the torque capacity of the driveline disconnect clutch is being reduced to zero and the driveline disconnect clutch is being prepositioned for being reapplied) when trace 306 it at a higher level that is near the vertical axis arrow. The driveline disconnect clutch is not being de-stroked when trace 306 is at a lower level that is near the horizontal axis.

At time t0, the driveline disconnect clutch commanded pressure is at a high level and the measured driveline disconnect clutch pressure is at a higher level where the driveline disconnect clutch is fully closed. The driveline disconnect clutch de-stroking state is not asserted so de-stroking of the driveline disconnect clutch is not in progress.

At time t1, a request to de-stroke the driveline disconnect clutch is made in response to an engine stop request (not shown). The de-stroke state changes from not asserted to asserted and the driveline disconnect clutch commanded pressure is gradually reduced to a positive value, such as an offset from the expected stroke pressure, where the expected stroke pressure is a pressure above which the driveline disconnect clutch torque capacity is expected to begin to increase from a value of zero. The expected stroke pressure may be learned by applying pressure to the driveline disconnect clutch and monitoring torque that is transferred through the disconnect clutch as driveline disconnect clutch pressure is increased. The offset may be a fixed value learned such that the clutch is not even partially stroked at that offset from stroke pressure when in steady state. The measured driveline disconnect clutch pressure begins to decline as the driveline disconnect clutch commanded pressure is reduced.

At time t2, the driveline disconnect clutch commanded pressure reaches the expected offset from stroke pressure and the measured driveline disconnect clutch pressure levels off near slightly above the expected offset from stroke pressure. Time t2 marks the beginning of a time when there is uncertainty as to whether or not the driveline disconnect clutch is actually de-stroked because the actual stroke pressure may vary and may not be known for a particular de-stroking event until the de-stroking event occurs due to variables such as clutch friction, hydraulic delay and the temperature of transmission fluid within the driveline disconnect clutch. The actual stroke pressure is a highest driveline disconnect clutch pressure where the driveline disconnect clutch torque capacity is zero. The driveline disconnect clutch de-stroke state remains asserted.

At time t3, the driveline disconnect clutch commanded pressure increases to stroke pressure momentarily.

At time t4, the driveline disconnect clutch commanded pressure is decreased to the expected offset from stroke pressure. The measured driveline disconnect clutch pressure is substantially unchanged and the driveline disconnect clutch de-stroke state remains asserted. There remains uncertainty as to whether or not the driveline disconnect clutch is actually de-stroked because the actual stroke pressure may vary and may not be known for a particular de-stroking event due to variables such as clutch friction and the temperature of transmission fluid within the driveline disconnect clutch. In addition, there may be some hysteresis in driveline disconnect clutch stroke pressure between de-stroking and stroking the driveline disconnect clutch.

At time t5, the driveline disconnect clutch commanded pressure is at the expected offset from stroke pressure and the measured driveline disconnect clutch pressure drops on its own to a level where it may be certain that the driveline disconnect clutch torque capacity is zero. This drop in pressure occurs due to the clutch finally de-stroking. Time t5 marks the end of the time period when there is uncertainty in whether or not the driveline disconnect clutch is de-stroked. The driveline disconnect clutch de-stroke state remains asserted.

At time t6, the driveline disconnect clutch commanded pressure remains at the expected offset from stroke pressure and the measured pressure is at the expected offset from stroke pressure. The driveline disconnect clutch de-stroke state changes state to not asserted since the driveline disconnect clutch has completed de-stroke after being fully released where the driveline disconnect clutch torque capacity is zero.

Thus, with the prior art approach, there is a one period of uncertainty as to whether or not the driveline disconnect clutch has been de-stroked. If driver demand torque or power is increased during this period of uncertainty, the driveline disconnect clutch may need more or less boost otherwise it may transfer more or less torque than may be desired.

Referring now to FIG. 4, plots of a prophetic driveline disconnect clutch de-stroking sequence according to the method of FIG. 5 are shown. The vertical lines at times t10-t13 represent times of interest in the plots. The plots are time aligned. The time scale of FIG. 4 is equivalent to the time scale of FIG. 3.

The first plot from the top of FIG. 4 shows commanded driveline disconnect clutch pressure versus time. The vertical axis represents pressure and pressure increases in the direction of the vertical axis arrow. The horizontal axis represents time and time increases from the left side of the plot to the right side of the plot. Trace 402 represents the pressure value for the commanded driveline disconnect clutch pressure.

The second plot from the top of FIG. 4 shows a measured driveline disconnect clutch pressure versus time. The vertical axis represents pressure and pressure increases in the direction of the vertical axis arrow. The horizontal axis represents time and time increases from the left side of the plot to the right side of the plot. Trace 404 represents the pressure value of the driveline disconnect clutch pressure. Horizontal line 450 represents the expected offset from the driveline disconnect clutch stroke pressure at which the clutch is not even partially stroked when in steady state.

The third plot from the top of FIG. 4 shows a driveline disconnect clutch de-stroking state versus time. The vertical axis represents the driveline disconnect clutch de-stroking state and the driveline disconnect clutch de-stroking state is asserted when trace 406 it at a higher level that is near the vertical axis arrow. The driveline disconnect clutch is not being de-stroked when trace 406 is at a lower level that is near the horizontal axis.

At time t10, the driveline disconnect clutch commanded pressure is at a high level and the measured driveline disconnect clutch pressure is at a higher level where the driveline disconnect clutch is fully closed. The driveline disconnect clutch de-stroking state is not asserted so de-stroking of the driveline disconnect clutch is not in progress.

At time t11, a request to de-stroke the driveline disconnect clutch is made in response to an engine stop request (not shown). The de-stroke state changes from not asserted to asserted and the driveline disconnect clutch commanded pressure is reduced from a value at which the driveline is fully closed to a value of zero or substantially zero (e.g., a value that is less than 2% of the full scale driveline disconnect clutch pressure) in one execution cycle (e.g., 20 milliseconds) of the method shown in FIG. 5. Thus, the driveline disconnect clutch commanded pressure changes from a value that fully closes the driveline disconnect clutch to a value of zero or substantially zero with no intervening driveline disconnect clutch pressure commands. As such, there is a step change in the driveline disconnect clutch pressure command. The measured driveline disconnect clutch pressure begins to decline as the driveline disconnect clutch commanded pressure is reduced.

At time t12, a de-stroking signature is indicated by the measured driveline disconnect clutch pressure falling below a threshold pressure (e.g., the expected offset from the driveline disconnect clutch stroke pressure) when the driveline disconnect clutch command pressure is zero or substantially zero. The driveline disconnect clutch commanded pressure is momentarily increased to stroke pressure in response to the driveline disconnect clutch pressure falling below the threshold pressure. The driveline disconnect clutch de-stroke state remains asserted.

At time t13, the driveline disconnect clutch commanded pressure is decreased to the expected offset from stroke pressure. The measured driveline disconnect clutch pressure falls further and the driveline disconnect clutch de-stroke state remains asserted. The measured driveline disconnect pressure drops to a level where it may be certain that the driveline disconnect clutch torque capacity is zero. Since it is known that the driveline disconnect clutch pressure is below a pressure where driveline disconnect clutch torque capacity is zero, it is determined that the driveline disconnect clutch is de-stroked. Time t13 marks the end of the time period when there is uncertainty in whether or not the driveline disconnect clutch is de-stroked. The driveline disconnect clutch de-stroke state remains asserted. It should be noted that the amount of time between time t11 and time t13 is much shorter than the amount of time between time t1 and time t5 shown in FIG. 3. Thus, the method of FIG. 5 may reduce the amount of time taken to de-stroke and the time that the operating status of the driveline disconnect clutch is uncertain.

At time t14, the driveline disconnect clutch commanded pressure remains at the expected offset from stroke pressure and the measured pressure is at the expected offset from stroke pressure. The driveline disconnect clutch de-stroke state changes state to not asserted since the driveline disconnect clutch has completed de-stroke after being fully released where the driveline disconnect clutch torque capacity is zero.

Thus, the approach according to the method shown in FIG. 5, rapidly de-strokes the driveline disconnect clutch and then brings the clutch back to where the driveline disconnect clutch is ready to be stroked (for example with boosting pressure). This process may reduce pressure hysteresis that may be exhibited by the driveline disconnect clutch. Further, the method of FIG. 5 reduces an amount of time during which the state of the driveline disconnect clutch may be uncertain.

Referring now to FIG. 5, a method for operating an engine of a hybrid vehicle is shown. The method of FIG. 5 may be at least partially implemented as executable instructions stored in memory of one or more controllers in the system of FIGS. 1 and 2. Further, the method of FIG. 5 may include actions taken in the physical world by a controller to transform an operating state of the system of FIGS. 1 and 2. Additionally, the method of FIG. 5 may provide at least portions of the operating sequence shown in FIG. 4.

At 502, method 500 determines vehicle operating conditions. Vehicle operating conditions may include but are not limited to vehicle speed, driver demand torque or power, engine temperature, integrated starter/generator speed and torque, engine speed, transmission line pressure, driveline disconnect clutch pressure, and state of battery charge. Method 500 proceeds to 504.

At 504, method 500 judges whether or not an engine shut down request has been made. Alternatively, method 500 may judge whether or not there is a request to open a fully closed driveline disconnect clutch. In one example, method 500 may judge that there is a request to open the driveline disconnect clutch from a fully closed state based on a value of a variable in controller memory. The value of the variable may be adjusted according to vehicle operating conditions. For example, the variable may be asserted to indicate a request to open the driveline disconnect clutch in response to enter a sailing mode where the engine rotates at idle speed while the driveline disconnect clutch is fully open. If method 500 judges that an engine shut down is requested or the driveline is requested to open, the answer is yes and method 500 proceeds to 506. Otherwise, the answer is no and method 500 proceeds to exit.

At 506, method 500 commands the driveline disconnect clutch from a fully closed position to a fully open position by adjusting a requested driveline disconnect clutch pressure command to zero or substantially zero (e.g., within less than 2% of full scale driveline disconnect clutch pressure) with no intervening driveline disconnect clutch pressure commands between the driveline disconnect clutch pressure command where the driveline disconnect clutch is fully closed and the zero or substantially zero pressure command. The driveline disconnect clutch pressure decrease may be executed in one execution cycle of method 500 (e.g., 20 milliseconds). The driveline pressure is adjusted to de-stroke the driveline disconnect clutch and fully open the driveline disconnect clutch.

Method 500 also looks up a threshold pressure for determining whether or not driveline disconnect clutch torque capacity is less than a threshold torque capacity from controller random-access memory or read-only memory. In one example, the threshold may be empirically determined via commanding zero pressure in the driveline disconnect clutch when the driveline disconnect clutch is fully closed and observing at what pressure the driveline disconnect clutch transfers zero or substantially zero torque (e.g., less than 2% of clutch torque capacity) while the driveline disconnect clutch is driven via the integrated starter/generator. The threshold pressure is a function of transmission fluid temperature and torque converter impeller speed. Method 500 proceeds to 508.

At 508, method 500 judges whether or not driveline disconnect clutch pressure is less than the threshold pressure determined at 506 for longer than a predetermined amount of time (e.g., 500 milliseconds). If so, the answer is yes and method 500 proceeds to 510. Otherwise, the answer is no and method 500 returns to 508.

At 510, method 500 commands the engine off. The engine may be commanded off by ceasing fuel flow to engine cylinders and deactivating spark that is supplied to the engine's cylinders. The engine is commanded off in response to the driveline disconnect clutch pressure being less than the threshold pressure so that engine fuel consumption is reduced and so that driveline noise and vibration may be maintained at a low level. Method 500 proceeds to 512.

At 512, method 500 judges whether or not a driveline disconnect clutch de-stroking signature has been observed via a controller. In one example, the driveline disconnect clutch de-stroking signature may be defined as the measured driveline disconnect clutch pressure falling below a threshold pressure (e.g., an offset pressure from a driveline disconnect clutch expected stroke pressure, or a pressure that is below the expected stroke pressure) when the driveline disconnect clutch command pressure is zero or substantially zero (e.g., less than 1% of full scale clutch pressure). In some examples, the driveline disconnect clutch de-stroking signature may further include the measured driveline disconnect clutch pressure falling below the threshold pressure for a period of time that is longer than a threshold amount of time (e.g., 50 milliseconds). In still other examples, the driveline disconnect clutch de-stroking signature may be indicated as a change in a derivative of the driveline disconnect clutch pressure exceeding a threshold value immediately following a time when the driveline disconnect clutch pressure is substantially constant (e.g., varied by less than ±5% of reading). Additionally, in some examples, the driveline disconnect clutch de-stroking signature may include the driveline disconnect clutch pressure increasing after it fell in response to the driveline disconnect clutch command pressure being zero or substantially zero. If method 500 judges that a driveline disconnect clutch de-stroking signature has been observed, the answer is yes and method 500 proceeds to 514. Otherwise, method 500 returns to 512.

At 514, method 500 indicates that the driveline disconnect clutch is de-stroked and method 500 adjusts the driveline disconnect clutch command pressure to a non-zero pressure (e.g., an expected offset from stroke pressure). The non-zero pressure may be a function of transmission fluid temperature and torque converter impeller speed. The torque converter impeller speed may be indicative of pump performance from which disconnect clutch pressure depends. Method 500 may indicate that the driveline disconnect clutch is de-stroked via setting a value of a variable in controller memory (e.g., random-access memory). Method 500 proceeds to 516.

At 516, method 500 judges whether or not there is an engine restart request. The engine restart may be requested during "change of mind" conditions where driver demand increases before the engine is fully stopped or where the engine start request is generated after the engine stops rotating. If method 500 judges that there is an engine stop request, the answer is yes and method 500 proceeds to 518. Otherwise, method 500 proceeds to exit.

At 518, method 500 proceeds to boost the clutch and then increases the torque capacity of the driveline disconnect clutch via commanding a higher driveline disconnect clutch pressure. As the driveline disconnect clutch pressure increases, torque is transferred from the integrated starter/generator to crank and rotate the engine. Alternatively, a flywheel starter such as 96 might be used to crank and rotate the engine. Method 500 proceeds to 520.

At 520, method 500 starts the engine via supplying fuel to the engine's cylinders and supplying spark to engine cylinders. Method 500 fully closes the driveline disconnect clutch after the engine is started. Method 500 proceeds to exit.

In this way, a driveline disconnect clutch may be opened and prepositioned so that the next time that the driveline disconnect clutch is closed, it is closed from a repeatable condition where driveline disconnect clutch torque capacity may be adequately controlled to reduce driveline torque disturbances. Further, fluid may be evacuated from the driveline disconnect clutch in a way that reduces uncertainty in driveline disconnect clutch operating states.

The method of FIG. 5 provides for a method for operating a vehicle, comprising: via one or more controllers, commanding an increase in a driveline disconnect clutch pressure in response to a driveline disconnect clutch de-stroke signature, where the driveline disconnect clutch de-stroke signature is a pressure that is less than an offset pressure from an expected stroke pressure of a driveline disconnect clutch for a threshold amount of time. In a first example, the method includes where the expected stroke pressure of the driveline disconnect clutch pressure is a non-zero pressure above which a driveline disconnect clutch torque capacity is expected to begin to increase from a value of zero. In a second example that may include the first example, the method includes where the threshold amount of time is a function of transmission fluid temperature. In a third example that may include one or both of the first and second methods, the method includes where the threshold amount of time is also a function of torque converter impeller speed. In a fourth example that may include one or more of the first through third methods, the method includes where commanding the increase in driveline pressure in response to the driveline disconnect clutch de-stroke signature includes commanding the increase in driveline pressure to the offset pressure from the expected stroke pressure. In a fifth example that may include one or more of the first through fourth methods, the method further comprises commanding the driveline disconnect clutch to transfer cranking torque to an engine in response to an engine start request. In a sixth example that may include one or more of the first through fifth methods, the method further comprises commanding the driveline disconnect clutch fully closed in response to the engine start request.

The method of FIG. 5 also provides for a method for operating a vehicle, comprising: via one or more controllers, shutting down an internal combustion engine in response to a most recent time a driveline disconnect clutch pressure drops below an offset pressure from an expected stroke pressure for a threshold amount of time. In a first example, the method further comprises commanding an increase in the driveline disconnect clutch pressure in response to a driveline disconnect clutch de-stroke signature, where the driveline disconnect clutch de-stroke signature is a pressure that is less than the offset pressure from the expected stroke pressure of a driveline disconnect clutch for the threshold amount of time. In a second example that may include the first example, the method includes where the driveline disconnect clutch de-stroke signature begins at the most recent time when the driveline disconnect clutch pressure drops below the offset pressure from the expected stroke pressure. In a third example that may include one or both of the first and second examples, the method includes where the expected stroke pressure is a non-zero pressure above which the driveline disconnect clutch torque capacity begins to increase from a value of zero. In a fourth example that may include one or more of the first through third examples, the method includes where the threshold amount of time is a function of transmission fluid temperature.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via one or more controllers, commanding an increase in a driveline disconnect clutch pressure in response to a driveline disconnect clutch de-stroke signature, where the driveline disconnect clutch de-stroke signature is a pressure that is less than an offset pressure from an expected stroke pressure of a driveline disconnect clutch for a threshold amount of time.

2. The method of claim 1, where the expected stroke pressure of the driveline disconnect clutch pressure is a non-zero pressure above which a driveline disconnect clutch torque capacity is expected to begin to increase from a value of zero.

3. The method of claim 2, where the threshold amount of time is based on a transmission fluid temperature.

4. The method of claim 3, where the threshold amount of time is further based on a torque converter impeller speed.

5. The method of claim 1, where commanding the increase in driveline pressure in response to the driveline disconnect clutch de-stroke signature includes commanding the increase in driveline pressure to the offset pressure from the expected stroke pressure.

6. The method of claim 1, further comprising commanding the driveline disconnect clutch to transfer cranking torque to an engine in response to an engine start request.

7. The method of claim 6, further comprising commanding the driveline disconnect clutch fully closed in response to the engine start request.

8. A system, comprising:
an internal combustion engine;
an integrated starter/generator;
a disconnect clutch positioned in a driveline between the internal combustion engine and the integrated starter/generator;
a transmission included in the driveline; and
a controller including executable instructions stored in non-transitory memory that cause the controller to command an increase in a driveline disconnect clutch pressure in response to a driveline disconnect clutch de-stroke signature, where the driveline disconnect clutch de-stroke signature is a pressure that is less than an offset pressure from an expected stroke pressure of a driveline disconnect clutch for a threshold amount of time, and where the driveline disconnect clutch de-stroke signature begins at a most recent time when the driveline disconnect clutch pressure drops below the offset pressure from the expected stroke pressure.

9. The system of claim 8, further comprising additional executable instructions to command the driveline disconnect clutch pressure in response to an engine stop request.

10. The system of claim 9, where the driveline disconnect clutch pressure is substantially zero.

11. The system of claim 8, further comprising additional executable instructions to shut down the internal combustion engine in response to the most recent time when the driveline disconnect clutch pressure drops below the offset pressure for the threshold amount of time.

12. The system of claim 11, where the threshold amount of time is based on transmission fluid temperature.

13. The system of claim 12, where the threshold amount of time is further based on a torque converter impeller speed.

14. The system of claim 8, further comprising additional executable instructions to command the disconnect clutch to transfer cranking torque to an engine in response to an engine start request.

15. The system of claim 14, further comprising additional executable instructions to command the driveline disconnect clutch fully closed in response to the engine start request.

16. A method for operating a vehicle, comprising:
via one or more controllers, shutting down an internal combustion engine in response to a most recent time a driveline disconnect clutch pressure drops below an offset pressure from an expected stroke pressure for a threshold amount of time.

17. The method of claim 16, further comprising commanding an increase in the driveline disconnect clutch pressure in response to a driveline disconnect clutch de-stroke signature, where the driveline disconnect clutch de-stroke signature is a pressure that is less than the offset pressure from the expected stroke pressure of a driveline disconnect clutch for the threshold amount of time.

18. The method of claim 17, where the driveline disconnect clutch de-stroke signature begins at the most recent time when the driveline disconnect clutch pressure drops below the offset pressure from the expected stroke pressure.

19. The method of claim 18, where the expected stroke pressure is a non-zero pressure above which a driveline disconnect clutch torque capacity begins to increase from a value of zero.

20. The method of claim 16, where the threshold amount of time is a function of transmission fluid temperature.

* * * * *